(12) United States Patent
Teran et al.

(10) Patent No.: US 6,579,446 B1
(45) Date of Patent: Jun. 17, 2003

(54) MULTI-PROCESS DISINFECTANT DELIVERY CONTROL SYSTEM

(75) Inventors: Alfredo J. Teran, Cape Canaveral, FL (US); Richard G. Wood, Merritt Island, FL (US); Nidal A. Samad, Merritt Island, FL (US); Timothy N. Tyndall, Merritt Island, FL (US); Wesley Todd Willoughby, Merritt Island, FL (US)

(73) Assignee: Agrimond, LLC, Cape Canaveral, FL (US)

(*) Notice: Subject to any disclaimer, the term of this patent is extended or adjusted under 35 U.S.C. 154(b) by 0 days.

(21) Appl. No.: 10/063,259

(22) Filed: Apr. 4, 2002

(51) Int. Cl.[7] ............................................. B01D 17/12
(52) U.S. Cl. ..................... 210/85; 210/87; 210/96.1; 210/192; 210/259; 422/186.14
(58) Field of Search .......................... 210/85, 87, 96.1, 210/103, 137, 143, 192, 194, 195.1, 259, 754, 760, 739; 422/186.07, 186.14

(56) References Cited

U.S. PATENT DOCUMENTS 5,547,584 A * 8/1996 Capehart .................... 210/259
5,741,416 A * 4/1998 Tempest .................... 210/96.1
5,785,864 A * 7/1998 Teran et al. ............... 210/96.1
6,090,294 A * 7/2000 Teran et al. ............... 210/96.1

OTHER PUBLICATIONS

Labonne, David L., Hampton, Perry, Design and Practical Application of a Unique Ozone Treatment System with Multiple Aquatic Exhibits, Third International Symposium on the Use of Ozone in Aquatic Systems, (pp. 51–58), CT, USA (Sep. 1992).

* cited by examiner

Primary Examiner—Joseph Drodge
(74) Attorney, Agent, or Firm—Anton J. Hopen; Smith & Hopen, P.A.

(57) ABSTRACT

The present invention is a multi-process water treatment system including a manifold, a disinfectant source adapted to supply a substantially continuous flow of disinfectant to the manifold, a plurality of water treatment processes fluidly coupled to the manifold, a plurality of sensor means, each sensor means coupled to a water treatment process, the sensor means adapted to communicate data representative of the concentration of the disinfectant present in each water treatment process, a central controller means adapted to receive data from the plurality of sensor means, a disinfectant discharge conduit, and a three-way diverting valve disposed in fluid communication between each branch of the manifold and each water treatment process, the valve having a first position wherein disinfectant is delivered to the water treatment process and a second position wherein disinfectant is delivered to the disinfectant discharge conduit.

14 Claims, 3 Drawing Sheets

Prior Art

MULTI-PROCESS DISINFECTANT DELIVERY CONTROL SYSTEM

BACKGROUND OF INVENTION

1. Field of Invention

This invention relates to water quality treatment, and more particularly to a system for controlling the delivery of disinfecting substances to multiple destinations.

2. Background of the Invention

Disinfection is generally known as any preparation that destroys the causes of infection. The most powerful disinfectants are oxidizing agents and chlorinated phenols. Among the many uses for such disinfectants is the treatment of water. Applications include, but are not limited to, aquaculture, potable water treatment, waster water treatment and the like. In many of these applications, multiple concurrent processes must be disinfected simultaneously. For example, in aquaculture, different sized fish tanks, each containing different species of fish may have distinct requirements for disinfection. A certain concentration of disinfectant that is optimum for one process may be detrimental to another process.

Ozone is commonly used to disinfect water. Ozone is produced by the action of ultraviolet radiation or electrical corona discharge on oxygen or air. It is a powerful oxidizing agent for disinfecting bodies of water. Ozone is known in the art to clean water for various uses. A drawback in the prior art has been the high overhead in maintaining an ozone generator for each individual tank or process. In 1992, David L. LaBonne and Perry Hampton described a "Design and Practical Application of Unique Ozone Treatment System with Multiple Aquatic Exhibits" at the Third International Symposium of the Use of Ozone in Aquatic Systems in Greenwich, Conn. The LaBonne presentation described a single ozone generating unit applied to multiple processes via an ozone splitter manifold. Two-way valves to each process are closed or opened responsive to ozone levels monitored at each process. Excess ozone is then sent to an ozone destruct unit.

The LaBonne system advanced the art by providing a means to employ the efficiency and simplicity of maintaining a single ozone-generating unit to feed multiple processes. However, closing the valve of one process led to an ozone spike in other processes before the entire system pressure could be recalibrated and equalized.

What is needed in the art is a multi-process disinfectant delivery system that employs a single disinfectant source yet avoid disinfectant spikes and pressure fluctuations due to adjustments to individual processes.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The present invention is a multi-process water treatment system including a manifold and a disinfectant source adapted to supply a substantially continuous flow of disinfectant to the manifold. The disinfectant may include, but is not limited to, ozone, cholorine, or the like. A plurality of water treatment processes are fluidly coupled to the manifold. The water treatment processes may include fish farming, hydroponics, laundry processes, swimming pool treatment, machinery cleaning waste water, car wash water recycling, or the like. A plurality of sensor means are provided, each sensor means coupled to a water treatment process, the sensor means adapted to communicate data representative of the concentration of the disinfectant present in each water treatment process. The sensor means may be adapted to detect pH levels, ozone levels, chlorine level, oxidation-reduction potential (ORP), or the like.

A central controller means adapted to receive data from the plurality of sensor means is provided. A disinfectant discharge conduit is provided. A three-way diverting valve disposed in fluid communication between each branch of the manifold and each water treatment process is communicatively coupled to the central controller. The valve having a first position wherein disinfectant is delivered to the water treatment process and a second position wherein disinfectant is delivered to the disinfectant discharge conduit.

Preferably, a flow meter is disposed downstream from the three-way diverting valve and is adjustably linked to the central controller means. The flow meter offers fine adjustment of gas flow, and emergency shut off of disinfectant to any process.

In the operation of the invention, the three-way diverting valve for a first process is switched by the central controller means from the first position to the second position responsive to data received from the sensor means indicating a predetermined disinfectant concentration has been achieved in the first process. The disinfectant originally supplied to the first process is then sent to the disinfectant discharge conduit thereby maintaining a consistent pressure in the system for disinfectant delivery to other processes.

It is therefore an object of the present invention to provide a multi-process water treatment system that can provide a consistent and regular flow of disinfectant to multiple processes from a single disinfectant source.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Although the present invention should not be construed as limited to ozone, an exemplary example of the invention compared against the prior art is herein provided using ozone as the disinfectant.

Figure 1:
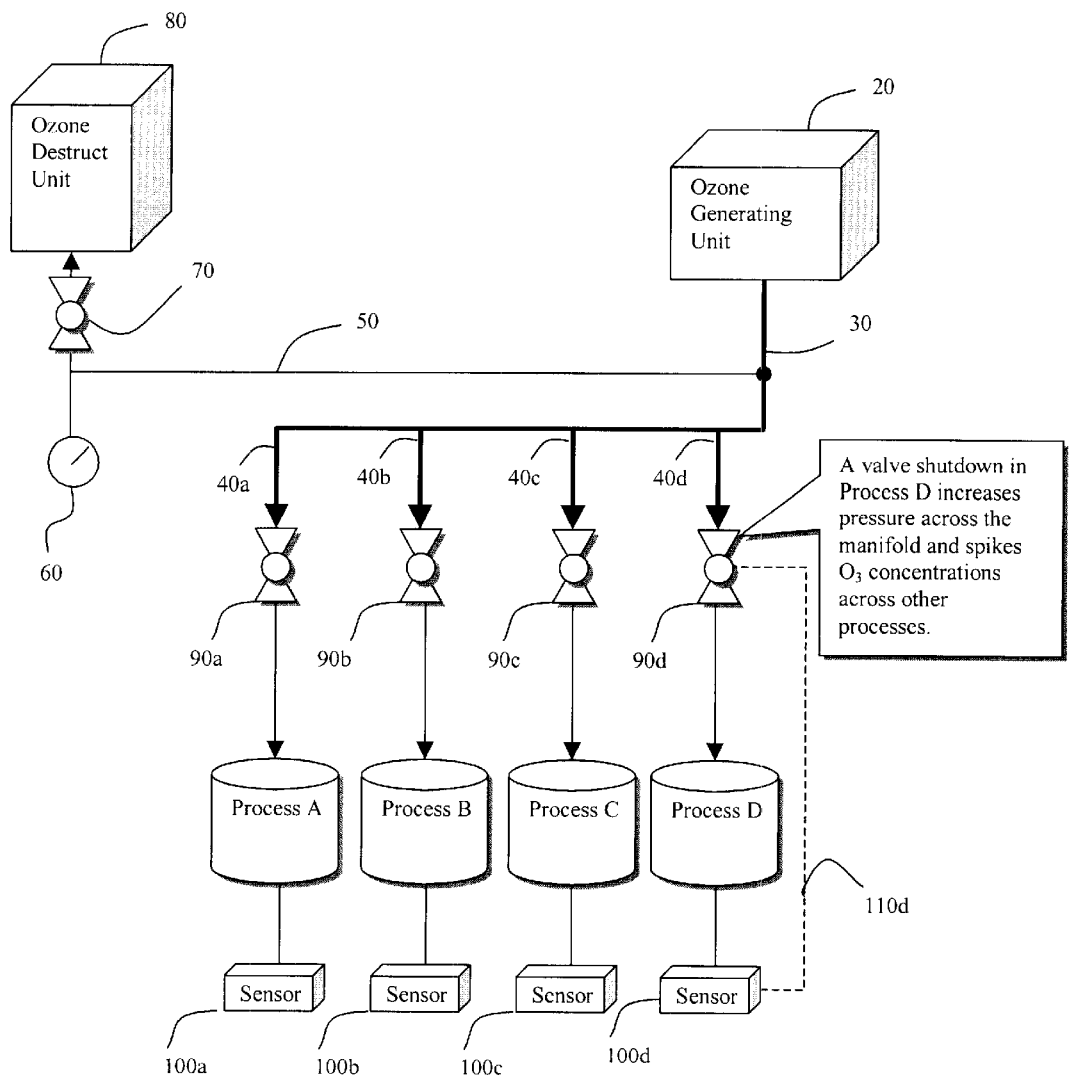
FIG. 1 is a diagrammatic view of the prior art.

FIG. 1 shows the prior art system including an ozone generating unit 20 supplying ozone to a manifold 30 having branches 40a–d. An ozone discharge conduit 50 is fluidly coupled to the ozone generating unit 20 upstream from the manifold 30. A discharge pressure gauge 60 is coupled to the ozone discharge conduit 50. A valve 70 is disposed between the ozone discharge conduit 50 and an ozone destruct unit 80.

Fluidly disposed between Processes A–D and each corresponding branch 40a–d of the manifold 30, two-way valves 90a–d are provided. Ozone generated in the ozone generating unit 20 passes through the manifold 30, down each branch 40a–d, through each two-way valve 90a–d and into Processes A–D.

Sensors 100a–d monitor the oxidation-reduction potential of each corresponding Process A–D. Each sensor 100a–d is communicatively coupled 110a–d with its corresponding two-way valve 90a–d. Sensor 100d communicates with two-way valve 90d through communication pathway 110d. Responsive to the value indicated by sensor 100d, two-way valve 90d is closed. As the ozone generating unit 20 is producing gas at a substantially constant output, pressure builds up in manifold branches 40a–c since two-way valve 90d is shut. Thus, ozone levels in Processes A–C spike until the discharge conduit 50 pathway to the ozone destruct unit 80 is opened by valve 70. Alternatively, should valve 90d need opening, valve 70 must be synchronized to avoid a loss of pressure in manifold branches 40a–c. It can be seen that efficient and stable operation the prior art system is difficult and prone to fluctuations in ozone delivery.

Figure 2:
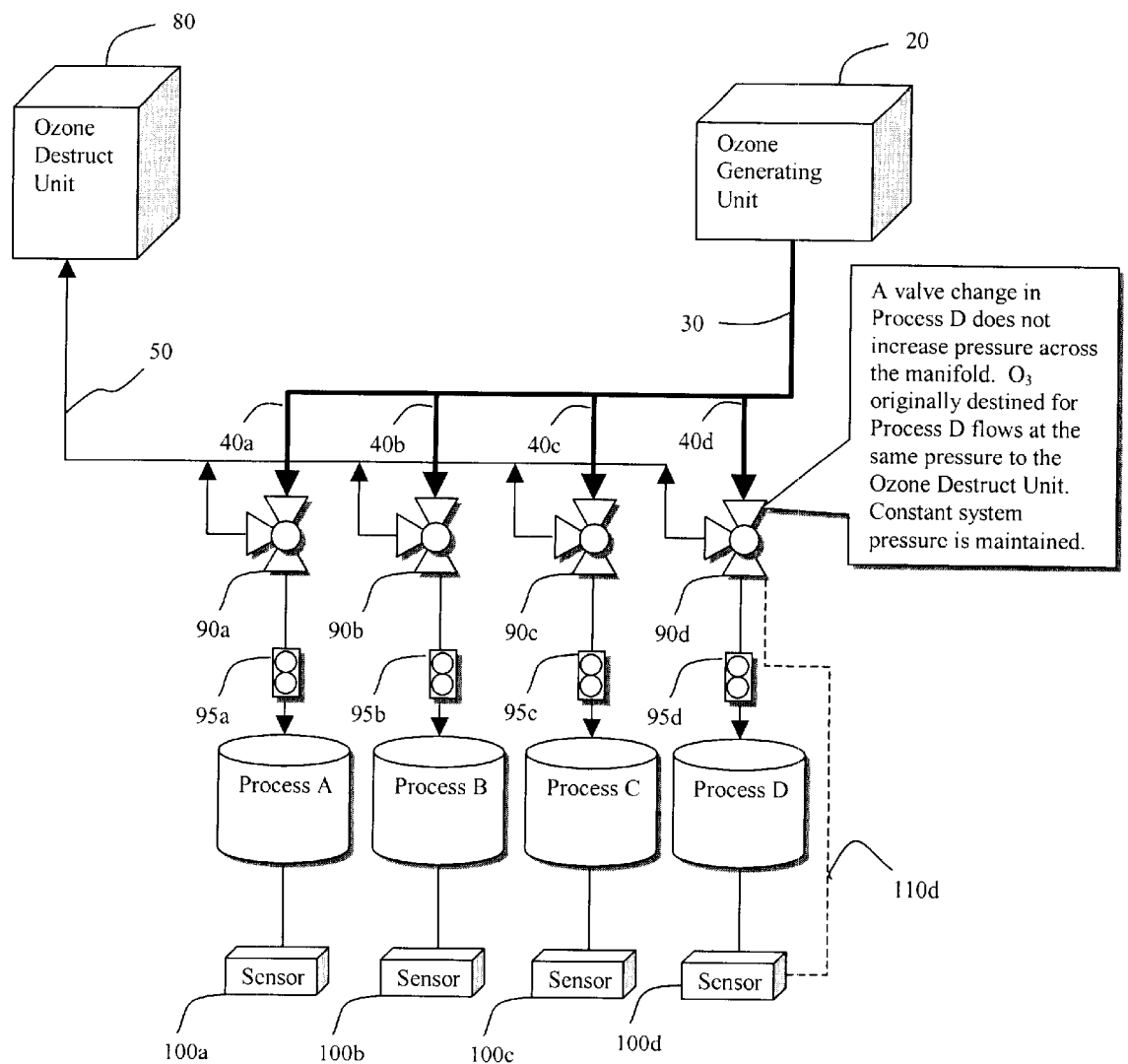
FIG. 2 is a diagrammatic view of the invention.

The present invention is shown in FIG. 2 wherein an ozone-generating unit 20 supplies a substantially constant flow of ozone gas to manifold 30. Branches 40a–d of the manifold 30 are fluidly coupled to three-way valves 90a–d. As opposed to the prior art where the ozone discharge conduit 50 is connected directly to the manifold 30, the ozone discharge conduit 50 in the present invention is fluidly coupled to each three-way valve 90a–d. Preferably, flow meters 95a–d are disposed between the three-way valves 90a–d and Processes A–D. Sensor 100d detects an ozone level and sends communication 110d to three-way valve 90d to shut off. However, rather than increasing the pressure across the manifold 30 as in the prior art, the three-way valve 90d diverts the ozone to the ozone discharge conduit 50 and on to the ozone destruct unit 80. The entire system maintains an even and consistent pressure regardless of how many, or how frequent valves are engaged or disengaged.

Figure 3:
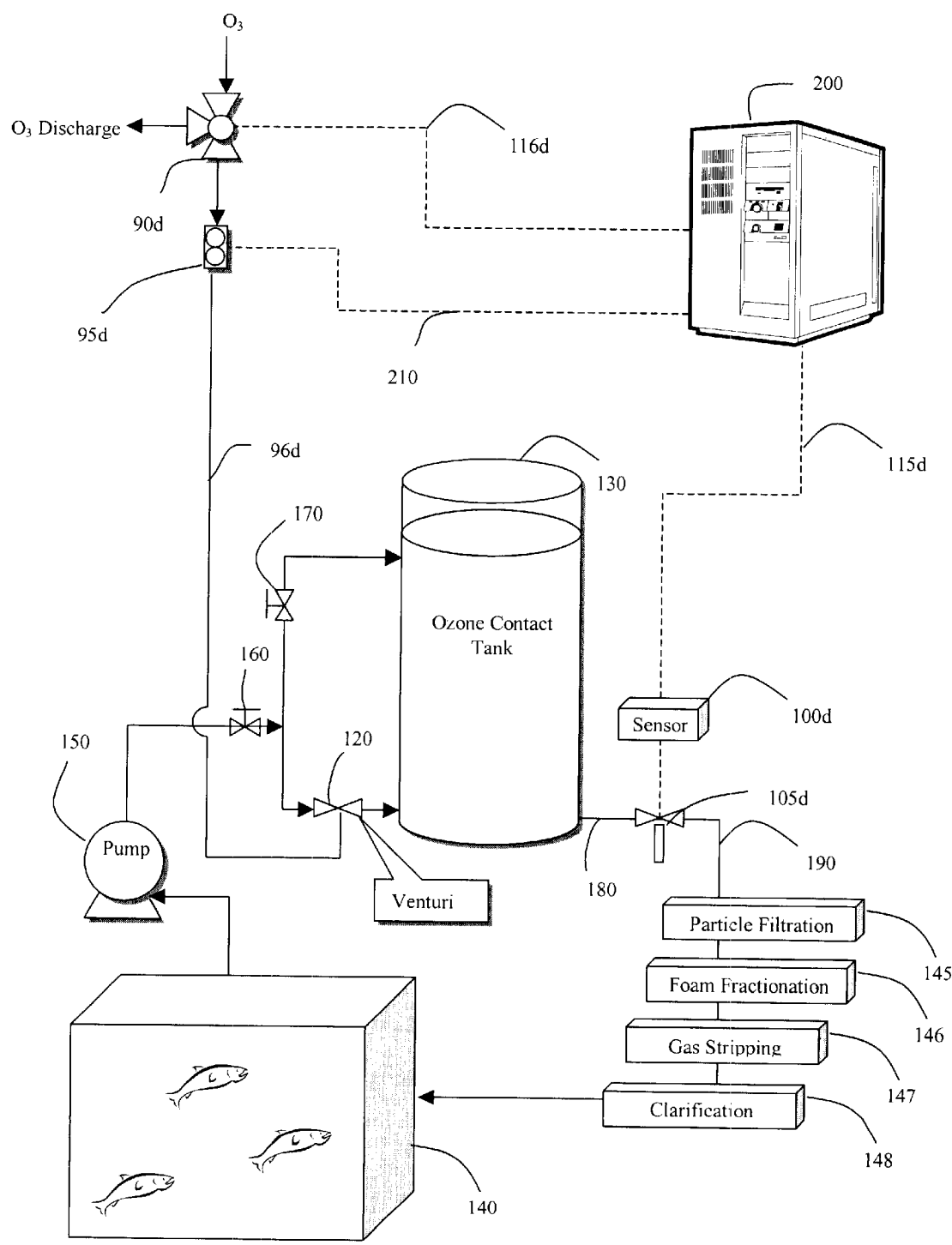
FIG. 3 is a diagrammatic detailed view of the invention.

A detailed illustration of the system is provided in FIG. 3 wherein ozone is delivered to the three-way valve 90d from the manifold 30 (FIG. 2). Flow meter 95d provides for fine adjustment of gas flow, and emergency shut off. Process conduit 96d delivers ozone to a venturi 120 adapted to introduce ozone into the ozone contact tank 130. Water from tank 140 is drawn by pump 150 to a primary valve 160. An adjusting valve 170 distributes about 80 percent of the water to the top of the ozone contact tank 130 and about 20 percent of the water to the bottom of the ozone contact tank 130 through the venturi 120. Water flows out a discharge conduit 180 and is monitored by sensor 100d. Water from discharge conduit 180 then flows back to the tank 140 through a return conduit 190. In a preferred embodiment of the invention, particulate filter 145 is fluidly disposed between tank 140 and ozone contact tank 130. Additional water treatment steps may also be employed including but not limited to foam fractionation 146, gas stripping 147, clarification 148 and the like. Sensor 100d obtains water condition data from probe 105d fluidly coupled to discharge conduit 180, sensor 100d is communicatively coupled to central controller 200. Central controller 200 also receives data from sensors 100a–c (FIG. 2). Central controller 200 further comprises a memory means and processing means adapted to store a predetermined sensor level for each process it monitors. Responsive to a threshold change in sensor level, central controller 200 executes a command to move three-way valve from a first position wherein ozone is delivered to the water treatment process to a second position wherein ozone is delivered to the ozone discharge conduit 50 (FIG. 2). A valve data path 116d from central controller 200 is provided to three-way valve 90d. A flow meter data path 210 from central controller 200 to flow meter 95d may be provided in a preferred embodiment of the invention.

The preferred embodiment of the invention operates with an ozone gas output between 1–200 grams per hour. System gas flow rate ranges between 10–120 standard cubic feet per hour. Water flow rate is between 20 and 1,000 gallons per minute. Water temperature should be maintained under 95° F. Monitoring and control may be of any variety of instruments provided at least one relay output is available. Materials of construction for piping and plumbing must be compatible with the disinfectant chemical used at the concentrations expected during normal operation.

Preferably, a backup ozone-producing generator provides redundancy to a primary ozone source. The same is true for any other disinfectant source utilized according to the present invention.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A multi-process water treatment system comprising:

a manifold;

a plurality of output branches in the manifold;

a disinfectant source adapted to supply a substantially continuous flow of disinfectant to the manifold;

a plurality of water treatment processes fluidly coupled to the manifold;

a plurality of sensor means, each sensor means coupled to a water treatment process, the sensor means adapted to communicate data representative of the concentration of the disinfectant present in each water treatment process;

a central controller means adapted to receive data from the plurality of sensor means;

a disinfectant discharge conduit;

a three-way diverting valve disposed in fluid communication between each branch of the manifold and each water treatment process, the valve having a first position wherein disinfectant is delivered to the water treatment process and a second position wherein disinfectant is delivered to the disinfectant discharge conduit;

whereby the three-way diverting valve for a first process is switched by the central controller means from the first position to the second position responsive to data received from the sensor means indicating a predetermined disinfectant concentration has been achieved in the first process, the disinfectant originally supplied to the first process is then sent to the disinfectant discharge conduit thereby maintaining a consistent pressure in the system for disinfectant delivery to other processes.

2. The system of claim 1 wherein the disinfectant is ozone.

3. The system of claim 2 further comprising an ozone destruct unit in fluid communication with the disinfectant discharge conduit.

4. The system of claim 2 wherein the sensor means measures dissolved ozone concentration.

5. The system of claim 2 wherein the sensor means measures oxidation-reduction potential.

6. The system of claim 1 wherein the disinfectant is chlorine-based.

7. The system of claim 6 wherein the sensor means measures chlorine level.

8. The system of claim 1 further comprising a contact column adapted for dissolving disinfectant into water.

9. The system of claim 1 further comprising a flow meter coupled to each water treatment process, the flow meter adapted to control the amount of disinfectant delivered to each water treatment process.

10. The system of claim 9 wherein the flow meter is disposed downstream from the three-way diverting valve.

11. The system of claim 9 wherein the flow meter is adjustably linked to the central controller means.

12. The system of claim 1 wherein the sensor means measures pH level.

13. The system of claim 1 wherein the sensor means measures oxidation-reduction potential.

14. A multi-process water treatment disinfection system comprising:

a manifold;

an ozone generator adapted to supply a substantially continuous flow of ozone into the manifold;

a plurality of output branches in the manifold;

a plurality of contact columns adapted to dissolve the ozone into water, each contact column fluidly coupled to a branch of the manifold;

a plurality of water treatment processes;

a plurality of sensor means, each sensor means coupled to a water treatment process, the sensor means adapted to communicate data representative of the concentration of ozone in the water treatment process;

a conduit fluidly coupling each individual contact column with a respective water treatment process whereby ozonated water is introduced into the water treatment process from the individual contact column;

a central controller means adapted to receive data from the plurality of sensor means;

an ozone discharge conduit;

a three-way diverting valve disposed in fluid communication between each branch of the manifold and each water treatment process, the valve having a first position wherein ozone is delivered to the corresponding water treatment process and a second position wherein ozone is delivered to the ozone discharge conduit;

whereby the three-way diverting valve for a first water treatment process is switched by the central controller means from the first position to the second position responsive to data received from the sensor means indicating a predetermined ozone concentration has been achieved in the first water treatment process, a quantity of ozone originally supplied to the first water treatment process is then sent to the ozone discharge conduit thereby maintaining a consistent pressure in the system for ozone delivery to other processes without adjusting the output of the ozone generator.

\* \* \* \* \*